Dec. 6, 1932.   C. E. JOHANSSON   1,889,897
SURFACE PLATE
Filed Dec. 18, 1930

Inventor
Carl Edvard Johansson,

Patented Dec. 6, 1932

1,889,897

UNITED STATES PATENT OFFICE

CARL EDVARD JOHANSSON, OF DETROIT, MICHIGAN

SURFACE PLATE

Application filed December 18, 1930, Serial No. 503,284, and in Sweden July 2, 1930.

The present invention relates to an improvement in such surface plates which are provided with a number of recesses or depressions in their test surface.

In the old surface plates of this type the said depressions have the shape of grooves extending over the entire surface plate and crossing each other, or else the shape of round or edged holes separated from each other in such manner that small surfaces remain between the grooves or holes, which small surfaces thus form the test surface of the surface plate.

While these old surface plates provide the desired advantages to a certain extent, still there remain certain disadvantages which render such surface plates unsuitable as bearing planes for accurate measurement of gauge blocks and similar bodies having plane and accurately finished surfaces, since for such measurements the test surface of the surface plate must be exactly plane.

For instance, if a gauge block is placed on a surface of the type just referred to, adhesion between the block and the test surface of the surface plate will occur in spite of the fact that said surface is divided into a number of small surfaces which are separated from each other by the grooves, or which are connected in the form of a network.

While the measuring is performed, the body to be measured, for instance the gauge block, must be moved in different directions below the measuring point, for obtaining measures at various points of the surface of the body. Such movement, however, is rendered difficult or impossible by the adhesion above referred to.

The movement is still more difficult if the body or the test surface of the surface plate is coated with a thin film of grease, which it is difficult to avoid.

When performing accurate measurements it has also proved to be very difficult to use surface plates of the constructions above referred to, in view of the fact that it is not possible to keep the surfaces between the depressions absolutely free from dust and other impurities.

The present invention has for its purpose to remedy these disadvantages, and consists principally in that the said depressions are made in such manner that the parts remaining between the same form sharp projections, such as knife-edges or points, all of which lie in one and the same plane, without forming any surfaces lying in such plane. The bodies to be measured, after having been well cleaned, are placed on said edges or points, which are also carefully wiped off previously.

In the accompanying drawing a few embodiments of the invention are illustrated by way of example.

Figure 1:
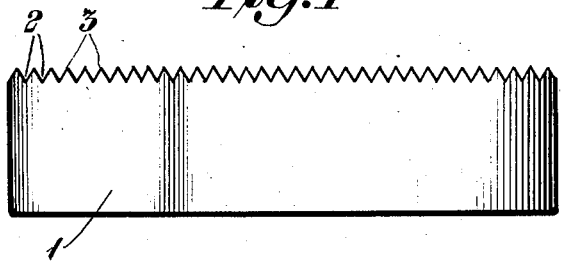
Fig. 1 shows a surface plate according to the invention viewed from the side and in the direction of the edges.

The surface plate consists in the usual manner of a plate 1 of steel or other suitable material, which has been subjected to heat treatment suitable to the material. According to the construction illustrated in Figs. 1 and 2, parallel and angular grooves 2 are cut in the upper face of said plate, said grooves extending across the surface plate and forming parallel knife-edges 3 having an edge angle of approximately 60°. All of these edges lie in one and the same plane and form together the test or working surface of the surface plate.

Figures 2, 3, 4:
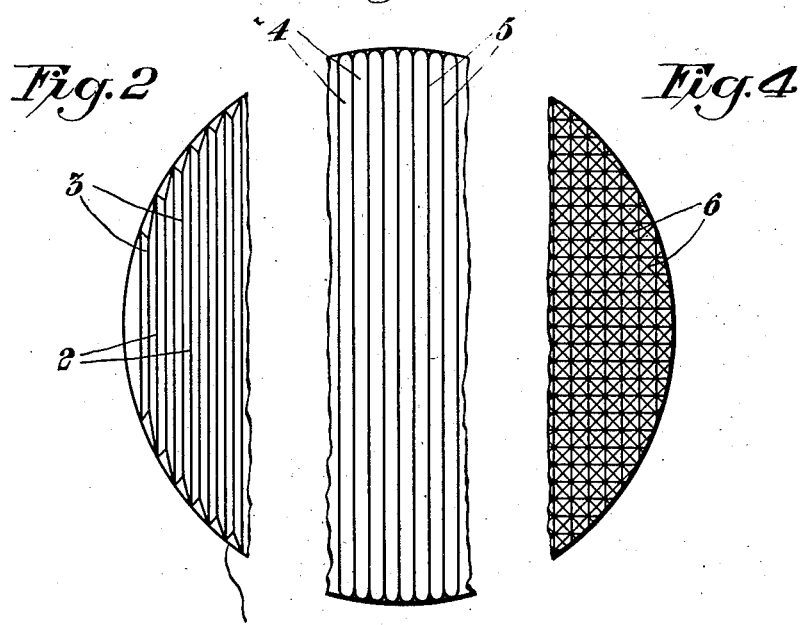
Fig. 2 is a fragmentary top plan view of the plate shown in Fig. 1.
Figs. 3 and 4 are similar plan views illustrating modified forms of the improvements.
Figure 5:
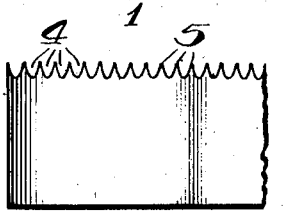
Figs. 5 and 6 are side elevations of the forms shown in Figs. 3 and 4, respectively.

According to the construction shown in Figs. 3 and 5, the grooves 4 are of approximate U-shape, so that the parallel knife edges 5 formed by said grooves obtain concave side faces. This is for the purpose that the edges shall better retain sharpness, even after the surface plate has been trued. Such adjustment must be made time and again in view of the fact that the edges become gradually worn while the surface plate is used, so that the edges must be planed off, so that they will lie in the same plane. Providing the edges with concave side faces thus ensures a longer life of the surface plate, since it is possible to true the edges several times without forming any appreciable surfaces in the test surface of the surface plate.

Figure 6:
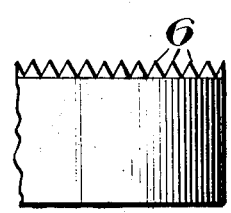

In Figs. 4 and 6 a third construction is shown in which the portions remaining between the depressions consist of points 6 having the shape of quadrilateral pyramids. This construction will obviously be obtained by providing the plate shown in Figs. 1 and 2 with a second system of parallel grooves extending at right angles to the grooves 2.

The embodiments above described and illustrated in the drawing are only to be regarded as examples, and it will be understood that they may be modified in respect of their details in several ways without departing from the principle of the invention. Thus, the sharp edges or the points may, of course, be given other shapes than those described and illustrated, which, however, are advantageous from the point of view of manufacture. The two constructions first described, i. e., those having edges 3 and 5, may also be used with advantage for measuring cylindrical bodies, which should of course be placed in such manner that they extend at right angles or approximately at right angles to the edges. It will easily be understood that with the present surface plate there is practically no risk of dust or other impurities disturbing the measuring result, whereas this risk is quite considerable when the old surface plates are used.

I claim:

1. A surface plate having its test surface defined by a plurality of sharp projections disposed in the same plane.

2. A surface plate having a plurality of grooves in one face thereof, the portions of the plate between the grooves terminating in sharp projections which define the test surface of the plate.

3. A surface plate having the face thereof on which is formed the test surface provided with a plurality of depressions of such shape that the portions remaining between such depressions form knife edges all of which lie in one and the same plane constituting the test surface without forming surfaces lying in such plane.

4. A surface plate having the face thereof on which is formed the test surface provided with a plurality of depressions of such shape that the portions remaining between such depressions form knife edges having concave side faces all of which edges lie in one and the same plane constituting the test surface without forming surfaces lying in such plane.

5. A surface plate having the face thereof on which is formed the test surface provided with a plurality of depressions of such shape that the portions remaining between such depressions form points which are the apices of quadrilateral pyramids all of which points lie in one and the same plane constituting the test surface without forming surfaces lying in such plane.

6. A surface plate having a plurality of V shaped grooves therein, contiguous walls of adjacent grooves converging at an angle of approximately 60° and terminating in sharp projections disposed in a single plane and defining the test surface of the plate.

7. A surface plate having a plurality of grooves therein with concave walls, the portions of the plate between said grooves terminating in knife edges disposed in a single plane and defining the test surface of the plate.

In testimony whereof, I have subscribed my name.

CARL EDVARD JOHANSSON.